United States Patent

[11] 3,586,104

[72] Inventor Walter E. Hyde
  Duncan, Okla.
[21] Appl. No. 881,003
[22] Filed Dec. 1, 1969
[45] Patented June 22, 1971
[73] Assignee Halliburton Company
  Duncan, Okla.

[54] FLUIDIC VORTEX CHOKE
  17 Claims, 4 Drawing Figs.
[52] U.S. Cl. .................................................. 166/142,
  138/42, 166/162
[51] Int. Cl. ...................................................... E21b 49/00
[50] Field of Search ............................................ 166/142,
  162, 179, 166; 138/37, 42, 43

[56] References Cited
  UNITED STATES PATENTS
2,203,577  6/1940  O'Neill et al. ................. 166/142
2,393,280  1/1946  Berger ........................... 138/42
2,893,432  7/1959  Gibson ........................... 138/42
2,978,046  4/1961  True ............................. 166/162
3,375,855  4/1968  Deeks ............................ 138/42

Primary Examiner—James A. Leppink
Attorney—Burns, Doane, Benedict & Mathis

ABSTRACT: A fluid choke is provided having a tubular housing and comprising a plurality of staged vortex forming modules. Each module is formed with a vortex chamber at one axial end and an axial sink passage extending from the other axial end partially through the axial thickness of the module. Various passageways connect the axial sink with the chamber to direct a stream of fluid inwardly through the axial sink and tangentially into the chamber wherein vortical currents are formed. The fluid dissipates kinetic energy within the chamber before rising and passing into an axial sink of an upper next adjacent module of the staged series. When fluid flows in the opposite direction, no vortex currents are formed and so the kinetic energy of the fluid is not dissipated except for normal frictional losses.

PATENTED JUN22 1971 3,586,104

INVENTOR
WALTER E. HYDE

BY
Burns, Doane, Benedict, Swecker & Mathis
ATTORNEYS

FLUIDIC VORTEX CHOKE

BACKGROUND OF THE INVENTION

The present invention relates to fluid chokes in which the velocity of fluids passing through a conduit may be greatly reduced. More specifically, the present invention contemplates a fluid choke which dissipates the kinetic energy of a fluid as it flows in one direction and permits normal flow as the fluid is caused to flow in the opposite direction.

In many fluid handling applications, such as in recovering production from oil-producing formations, it is often necessary to check the velocity of fluids passing through conduits used for effecting the oil recovery. A choke device may be used to control the velocity of the fluids rushing into a drill conduit string. When the conduit string is equipped with a hydraulic sampling device, such as that disclosed in U.S. Pat. No. 2,740,479 issued to Schwegman and assigned to the assignee of the present invention, it is essential to insure that the fluid velocity from the formation into the sampler reservoir, which is under atmospheric pressure, is not excessive. If the velocity of the fluids is unusually high, portions of the formation may break off and block the passages of the sampler or severely erode parts of the sampler and drill conduit string. While it is necessary to check the velocity of the fluid flowing in one direction, it is also advantageous to permit a relatively free flow of fluid in the opposite direction.

The existing devices used to perform the above-discussed functions commonly comprise a filter type of an element with very small orifices which are easily plugged with the sediment carried by the formation fluids and which are totally impractical unless an expensive and intricate filtering system is used therewith. Another type of device which has been used is what is known as a "water choke" wherein fluids are caused to enter a large opening of the choking element and push against a piston which forces clean fluids through a filtering type choke. The piston operates as a separator between the two fluids but, due to the intricacies of such a device, the system is unusually bulky, expensive and the several moving parts require substantial maintenance. A third type of a choking device incorporates a relief valve wherein the fluid overcomes a fixed spring force upon reaching a certain high velocity. The necessity of calibrating the spring settings and the malfunctioning of such devices has made the use of such relief valves unreliable.

OBJECTS AND SUMMARY OF THE INVENTION

It is therefore an object of the present invention to provide a choking device which greatly reduces the velocity of fluids passing therethrough in one direction but permits a relatively free flow in the opposite direction.

It is another object of the present invention to provide a choking device which is relatively free of clogging due to the buildup of sediment particles entrained in a fluid passing therethrough.

It is still another object of the present invention to provide a choking device which reduces the velocity of fluids passing therethrough to a far greater degree than can be accomplished by existing such devices.

It is a further object of the present invention to provide a fluid-choking device for reducing the velocity of fluids passing therethrough which device incorporates no moving parts and requires a minimum of maintenance.

It is still a further object of the present invention to provide a fluid-choked device which is of simple construction and may be inexpensively manufactured.

It is yet a further object of the invention to provide a fluid-choking device which obviates many of the problems presented by such devices currently being used in the field.

The above-listed objects and those which will become apparent from the detailed description of the preferred embodiment are carried out by providing a method and an apparatus for causing a fluid to flow vortically so as to dissipate kinetic energy as it flows in one direction and to flow free of vortical currents as the fluid flows in the opposite direction.

The invention is specifically pointed out and distinctly claimed in the concluding portion of the specification and the preferred embodiment is disclosed in the detailed description which may best be understood when taken in connection with the accompanying drawing in which:

DETAILED DESCRIPTION OF THE PREFERRED EMBODIMENT

Figure 1:
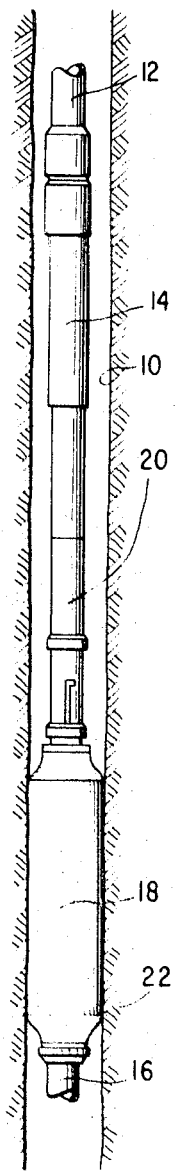
FIG. 1 shows the apparatus of the present invention used in connection with an oil recovery string inserted within a well bore and having a hydraulic reservoir sampler device connected therein.

Referring now to the drawing in which like numerals are used to indicate like parts throughout the various views thereof, FIG. 1 shows an oil well drill assembly inserted within a well bore 10. A drill pipe 12 forms the upper portion of the drill string and a hydraulic sampling reservoir 14 connected therewith. This sampling device may be of the type shown in the U.S. Pat. No. 2,740,479 issued to Schwegman and assigned to the assignee of the present invention. An anchor pipe 16 forms the lower portion of the drill string and is connected with a packer device 18. The packer 18 is used to prevent the flow of fluids around the outer surface of the drill string. A vortex choke device 20 connects the sampler reservoir 14 with the packer device 18 and is used to check the flow of fluids rushing upward from the formation 22 through the anchor pipe 16 and packer member 18 into the hydraulic sampling reservoir 14. If too high an upward fluid velocity is permitted through the drill string, erosion and a breaking off of the formation near the area of the bore 10 will result. Therefore, the choke device 20 is placed in the string to keep the upward velocity of the fluid to within acceptable limits.

Figure 2:
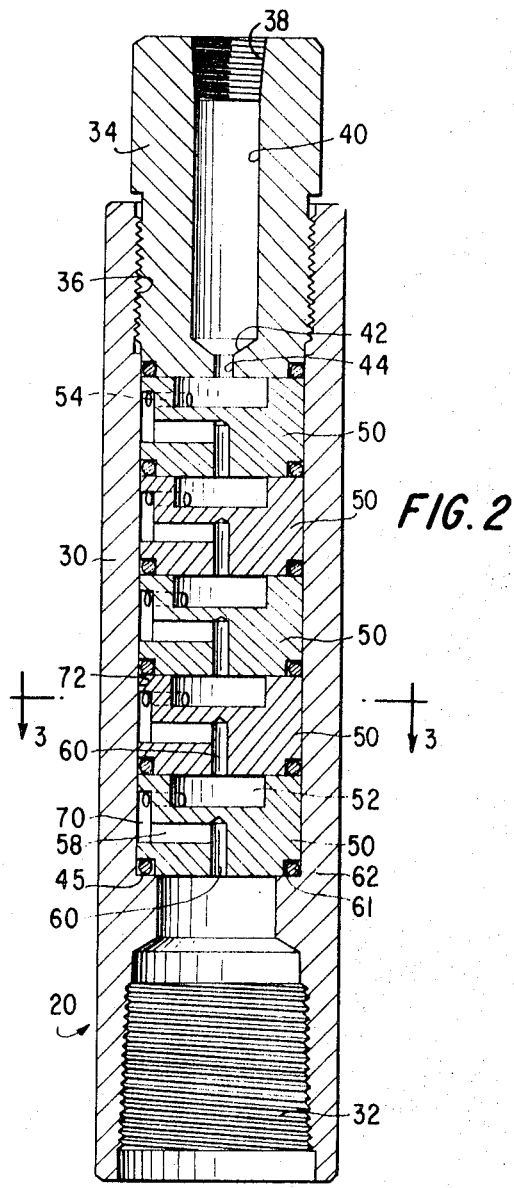
FIG. 2 is a sectional view taken along the axis of a vortex choke apparatus constructed in accordance with the present invention.

Referring now to FIG. 2, a vortex choke 20 is shown in cross-sectional view along its axis as comprising a tubular housing 30 having internal threads at the lower axial end for connection with the packer member 18 shown in FIG. 1. An adapter member 34 may be threadedly engaged within internal threads 36 formed at the upper axial end of the tubular housing 30. The adapter member 34 is similarly provided with internal threads 38 at its upper axial end for connection with the hydraulic reservoir sampling device 14 when properly connected within a drill string. The adapter member is provided with a central cylindrical passageway 40 which transitions at its lower end into a generally conical configuration and ultimately terminates in a smaller axial passageway 44. A series of vortex-forming modules 50 are supportingly staged between the adapter member 34 and a radially extending internal shoulder 45 formed above the lower axial threaded end of the tubular housing 30.

Figure 4:
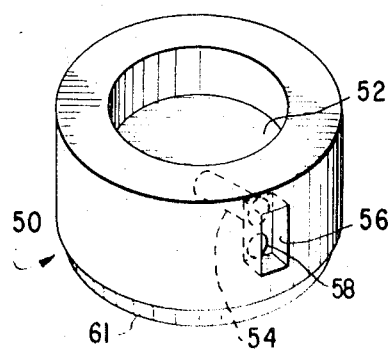
FIG. 3 is a cross-sectional view of the device shown in FIG. 2 taken along lines 3–3 and FIG. 4 is a pictorial view of the vortex-forming module which may be used in practicing the present invention.
Figure 3:
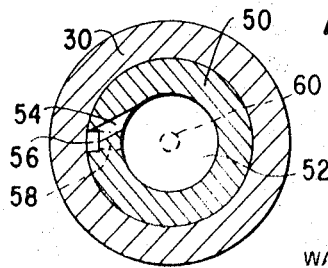

Referring to FIGS. 3 and 4 which show a cross-sectional area of the device of FIG. 2 and a pictorial view of a single module 50, respectively, it can be seen that each module is formed with a cylindrical chamber 52 at an upper axial end thereof. A fluid passageway 54 is formed within the module and is oriented to be tangential with respect to the axial surface of the chamber 52. The centerline of the tangential passageway 54 may lie within a radial plane of the cylindrical module. A generally rectangular slot 56 is machined longitudinally along the cylindrical surface of the module and communicates with the tangential fluid passageway 54 at the upper axial end of the slot 56.

At the lower axial end of the slot 56, a generally radial passageway 58 is provided which extends from the slot 56 to the approximate axis of the cylindrical module. An axial sink fluid passageway 60 extends axially from the lower axial end of the module to the inner end of the radial fluid passageway 58 so as to be in fluid communication relationship therewith. The axial sink fluid passageway 60 does not extend entirely through the axial extension of the module so as to directly communicate with the vortex chamber 52 formed at the upper axial end of the module 50.

An annular groove 61 is machined about the lower circumferential periphery of the module and provides a space for the insertion of an O-ring seal 62 which functions to prevent the passage of fluids about the outer cylindrical surface of the module. FIG. 2 shows the O-ring seals properly disposed within the grooves 61 and supported by the upper axial surface of a next lower adjacent module. The lowermost O-ring seal is axially supported on the radially extending internal shoulder 45 of the housing 30.

In operation, fluid rushes from the formation 22, into well bore 10 to the anchor pipe 16, through the packer member engaged within the bore 10, and into the lower axial end of the vortex choke of the present invention. Fluid then flows into the axial sink passageway 60 of the lowermost of the staged modules and flows thence through the radial passageway 58 into a second axially extending passageway 70 which is defined by the axially extending slot 56 of the module in cooperation with the inner wall 72 of the vortex choke housing 30 which forms the outer wall of the second axial passageway. It can be seen that this second or "intermediate" axial passageway may be machined relatively simply since it may be formed on the module surface merely as a slot and it is not necessary to manipulate a boring tool or to provide a complicated casting die to form an intricate internal passageway.

After flowing up through the axial sink passageway 60 and through the radially extending passageway 58 into the second or intermediate axial passageway 70 defined by the slot 56 and the inner wall 72 of the tubular housing 30, the fluid rushes into the vortex chamber 52 of the lowermost module through the tangentially oriented passageway 54 so as to form a vortex swirl within the chamber 52. It is during this swirling within the chamber 52 that the fluid dissipates much of its kinetic energy and its actual velocity is reduced by a factor of 3 to 5. As the vortex chamber 52 fills up with fluid, the fluid gradually enters the next module of the series through the axial sink passageway 60 thereof. Of course, the centrifugal forces created by the swirling fluid resist the radially inward flow toward the axial sink 60 of the next upper adjacent module and it is this resistance which checks the axial fluid velocity through the choke. After flowing through the radial passageway and the intermediate axial passageway into the vortex chamber through the tangentially oriented passageway of the next upper module, the fluid repeats the vortical swirling motion that it was subjected to in the lowermost module and is once again reduced in axial velocity by a factor of 3 to 5.

As the fluid exits from the uppermost module of the staged series of modules and through the axial passageway 44 of the adapter 34 into the hydraulic sampling reservoir 14 connected therewith, the fluid velocity may have been reduced to within 1/320 of its initial velocity if each module were designed to have a velocity reduction factor of 3. If the modules are designed with a reduction factor of 4 per stage, then the velocity may be reduced to within an incredible 1/1020 of its initial axial velocity.

When the fluid flow is reversed, the fluid flows free of vortex currents and so the only kinetic energy dissipation is caused by frictional losses through the various bends forming the tortuous path through which the fluid must pass. This friction, of course, cannot even be compared with the great resistance to axial flow brought about by the high pressure drop experienced by the fluid in passing vortically in the opposite direction. The higher the tangential velocity of the fluid passing into the vortex chamber, as fluid passes in the upward or "hard" direction, the greater the centrifugal force within the chamber 52 resisting the radially inward flow toward the central axial sink of the next aligned module so that a substantial portion of any increased kinetic energy may be immediately consumed if the axial velocity of the fluid should suddenly increase.

The function of the present invention may be applied to other apparatus such as pumps or may even be used as a valve. Since the fluid velocity may be reduced by a factor of 1,000 as the fluid flows in one direction and since the fluid may flow relatively freely in the other direction, such a device is analogous to a check valve and may be used as such in many applications. Of course, the more modules that are staged in the series housed within the tubular element 30, the greater the reduction of axial velocity of the fluid passing therethrough. Similarly, a single module may be used if only a reduction of 3 to 5 is desired.

It should be noted, that the construction of the apparatus according to the present invention is very uncomplicated. The modules 50 may be machined from cylindrical blanks requiring merely the boring of the chamber 50, the machining of an angular groove about the lower axial end of the blank and the drilling of three passageways through areas of the module which are readily accessible for machining. The provision of the slot-type passageway 56 makes for the easy machining of an operable module and this feature is believed to be significant for that reason. Of course, the module may also be diecast.

Since the apparatus according to the present invention has no moving parts, the problems attending such moving parts have been obviated. The passageways of the modules 50 may be relatively wide so as to preclude blockage by sediment carried within the fluids issuing from the formation. The apparatus of the present invention provides great flexibility in that the axial velocity reduction factor may be adjusted by merely varying the number of modules used. Likewise, the machining or the diecasting of each module is not subjected to the requirements of critical tolerances. The provision of an O-ring seal about the lower axial end of each module prevents the passage of fluid around the outer surface of the module so the outer surface need not be tightly conforming to the inner surface 72 of the tubular housing 30. This overall absence of critical tolerance requirements, of course, simplifies manufacturing.

While what has been disclosed is the preferred embodiment of the present invention, it is, of course, understood that various modifications and changes may be made therein without departing from the true spirit and scope of the invention. It is therefore intended to cover in the appended claims all such modifications and changes as may fall within the true scope of the present invention.

What I claim is:

1. A fluid choke for reducing the axial velocity of fluids passing therethrough comprising:
   a. a tubular housing;
   b. at least two voltex forming modules disposed within said housing;
   c. each said module comprising
      1. a cylindrical body
      2. a vortex chamber formed in one axial end said body
      3. a first passageway extending from an outer cylindrical surface of said body tangentially through an axially extending wall of said vortex chamber
      4. a second passageway extending from a second axial end of said body partially through the axial thickness of said body but not penetrating said vortex chamber
      5. 6. third passageway extending from an inner end of said second passageway to the outer cylindrical surface of said body adjacent an outer end of said first passageway
      (6) a fourth passageway comprising a slot formed in the cylindrical surface of said body and providing fluid communication between said first and said third passageways;

d. each said module aligned with each other said module within said housing and positioned with respect to an adjacent module so that said second axially extending passageway of one module is in direct fluid communication relationship with said vortex chamber of said other adjacent module;

e. whereby fluid passing through said tubular housing in one direction is caused to flow vortically through each said module and flows free of vortex currents when flowing in the opposite direction.

2. A fluid choke according to claim 1 wherein said vortex chamber formed in one axial end of each said cylindrical body comprises a cylindrical chamber disposed concentrically within each said body.

3. A vortex choke according to claim 2 wherein the centerline of said second passageway extending from a second axial end of said body partially through the axial thickness of said body but not penetrating the vortex chamber is coincident with the axis of said cylindrical body.

4. A fluid choke according to claim 1 wherein a portion of the cylindrical body comprising each said module is formed with an annular groove about the circumferential periphery thereof for receiving an O-ring seal therein.

5. A fluid choke according to claim 1 wherein said fourth passageway is defined by the surfaces of said slot formed in the cylindrical surface of the cylindrical body of each said module and by the inner wall of said tubular housing.

6. A fluid controller comprising:
a. a housing
b. choke means within said housing and defining a fluid flow path for dissipating, through the creation of vortical flow, the kinetic energy of a fluid passing therethrough as the fluid flows in one direction through said flow path, and for causing the fluid passing through said choke means in an opposite direction to pass through the same fluid flow path relatively free of energy dissipation by reason of vortical flow;
c. said choke means comprising at least two vortical current forming modules, stacked upon one another, and each having an axial inlet, a vortex chamber, and means for directing the fluid from said axial inlet tangentially into said vortex chamber.

7. A fluid controller comprising:
a. a housing;
b. choke means within said housing for dissipating, through creation of vortical flow, the kinetic energy of a fluid passing therethrough as the fluid flows in one direction, and for causing the fluid to pass in the opposite direction relatively free of energy dissipation by reason of vortical flow, said choke means comprising a plurality of axially aligned vortex chamber modules; each said module being formed with an annular groove about a circumferential portion thereof; and an O-ring seal disposed within each said groove for preventing the passage of fluid between the outer surface of each said module and the inner wall of said housing.

8. A drill string for removing oil from a bore formed within a formation comprising:
a. a drill pipe;
b. a hydraulic reservoir sampling device for trapping a sample of the production;
c. a packer member;
d. a fluid controller defining a fluid flow path and connected between said hydraulic reservoir sampling device and said packer for dissipating, through the creation of vortical flow, the kinetic energy of the oil flowing in an upward direction through said flow path and for causing the flow of fluid through the fluid controller in an opposite direction through the sane flow path in a relatively free flow; said controller comprising at least two vortex-forming modules stacked upon one another and each having an axial inlet, a vortex chamber, and means for directing oil from said axial inlet tangentially into said vortex chamber.

9. A drill string for removing oil from a bore formed within a formation comprising:
a. a drill pipe;
b. a hydraulic reservoir sampling device for trapping a sample of the production;
c. a packer member;
d. a fluid controller connected between said hydraulic reservoir sampling device and said packer for dissipating, through vortical flow, the kinetic energy of the oil flowing in an upward direction and for permitting the relatively free flow of fluid as it passes through the fluid controller in the opposite direction, said controller comprising a plurality of axially aligned vortex chamber modules; each said module being formed with an annular groove about a lower circumferential portion thereof; and an O-ring seal retained within each said groove to prevent the passage of oil along the outer surface of each said module.

10. A drill string for removing oil from a bore formed within a formation comprising:
a. a drill pipe;
b. a hydraulic reservoir sampling device for trapping a sample of the production;
c. a packer member;
d. a fluid controller connected between said hydraulic reservoir sampling device and said packer for dissipating, through vortical flow, the kinetic energy of the oil flowing in an upward direction and for permitting the relatively free flow of fluid as it passes through the fluid controller in the opposite direction, said controller comprising:
A. a tubular housing;
B. at least two vortex-forming modules disposed within said housing;
C. each said module comprising:
1. a cylindrical body,
2. a vortex chamber formed in one axial end of said body,
3. a first passageway extending tangentially from an outer cylindrical surface of said body through an axially extending inner wall of said vortex chamber;
4. a second passageway extending from a second axial end of said body partially through the axial thickness of said body but not penetrating said vortex chamber,
5. a third passageway extending from an inner end of said second passageway to the outer cylindrical surface of said body adjacent an outer end of said first passageway,
6. a fourth passageway extending longitudinally between said first and said third passageways;
D. each said module aligned with each other said module within said housing and positioned with respect to an adjacent module so that said second axially extending passageway of one said module is in direct fluid communication relationship with said vortex chamber of the other said module;
E. whereby fluid passing through said housing in one direction is caused to flow in vortical currents within each said module and is permitted to flow free of vortical currents when flowing in the opposite direction.

11. A drill string for removing oil from a bore formed in a formation according to claim 10 wherein each said cylindrical body of each said module is formed with an annular groove about a lower circumferential portion thereof for receiving an O-ring seal therein; the lowermost O-ring seal being supported axially by an internal radially extending shoulder formed in said tubular housing and; each said remaining O-ring seals being supported by an upper radially extending face of a next lower adjacent module.

12. A method of reducing the velocity of fluids being directed through a drill string from a formation comprising the steps of:
a. providing a fluid flow path by disposing a plurality of vortical current forming modules within a section of the drill string; and
b. aligning and orienting the modules so that the fluid flows upward in a series of vortical currents but so that fluid flowing downward through said drill string is caused to flow through said flow path and may flow freely downward without vortical currents.

13. A vortical current forming module comprising:
a. a cylindrical body;
b. a vortex chamber formed within a first axial end of said cylindrical body;
C. an axial inlet passageway extending inwardly from a second axial end of said cylindrical body but not so penetrating said vortex chamber; and
d. fluid passageway means connecting said axially extending inlet passage with said vortex chamber wherein fluid entering said axially extending passageway is directed through the modular cylindrical body and flows tangentially into said vortex chamber so as to form vortical currents therein.

14. A module according to claim 13 wherein said passageway means connecting said axial inlet passageway and said vortical current forming chamber includes an axially extending notch formed in the outer cylindrical surface of said module.

15. A module according to claim 13 wherein an annular groove is formed about the outer circumferential periphery of said second axial end of said cylindrical body comprising said module; whereby an O-ring seal may be received therein.

16. A vortical current forming module according to claim 20 wherein said fluid passageway means comprises:
a tangential passageway extending tangentially from an outer cylindrical surface of said body through an axially extending inner wall of said vortex chamber;
a lateral connecting passageway extending from an inner end of said axial inlet passageway to the outer cylindrical surface of said body adjacent an outer end of said tangential passageway; and
a longitudinal connecting passageway extending longitidunally between said tangential passageway and said lateral connecting passageway.

17. A method for checking the velocity of fluid through a conduit comprising the steps of:
causing fluid to flow through a flow path in the conduit in one direction while dissipating, through the creation of vortical currents, the kinetic energy of the fluid; and
causing fluid to flow through the same flow path in an opposite direction without the creation of vortical currents;
said flow path being formed by a plurality of vortex-forming modules stacked one on top of another.